2 Sheets—Sheet 1.
I. MILLS.
HARVESTING MACHINE.
No. 179,593. Patented July 4, 1876.
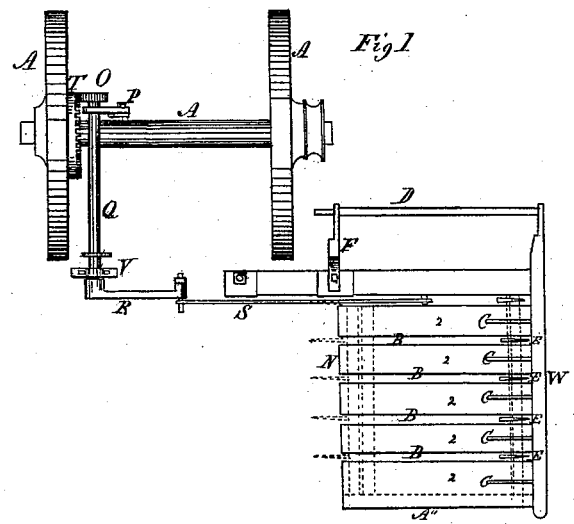
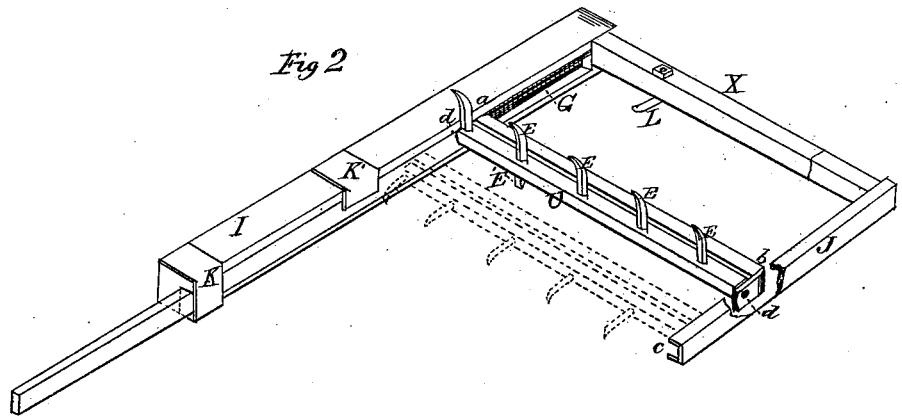
Witnesses
Wm B Bruce
C. C. Hohman
Inventor
Isaac Mills
By Wm B Bruce
atty 2 Sheets—Sheet 2.

I. MILLS.
HARVESTING MACHINE.

No. 179,593. Patented July 4, 1876.

Witnesses.
W. B. Bruce,
C. C. Hohman

Inventor
Isaac Mills
By Wm. Shued
att'y

UNITED STATES PATENT OFFICE.

ISAAC MILLS, OF HAMILTON, CANADA.

IMPROVEMENT IN HARVESTING-MACHINES.

Specification forming part of Letters Patent No. 179,593, dated July 4, 1876; application filed October 19, 1875.

*To all whom it may concern:*

Be it known that I, ISAAC MILLS, of the city of Hamilton, in the county of Wentworth, in the Province of Ontario, Dominion of Canada, have invented a new and useful Improvement in Reaping-Machines; and I do hereby declare that the following is a full, clear, and exact description of the construction and operation of the same.

The invention relates to the construction of a reaper with a square table, wherein is operated a single trip-rake moving horizontally under the table, said table having lateral openings, through which the teeth of the rake project and slide.

The rake is constructed to slide in grooves in the front and rear portion of the table, and is driven by means of cog-gearing acted on through a shaft, crank, and connecting-rod, imparted by the drive-wheel, the movement of the rake being governed by a lever under the control of the driver, which throws the parts in and out of gear, as desired.

By constructing a reaper with my single rake operated by the drive-wheel, the weight of the machine is materially reduced, rendering the draft much lighter, so much so that one horse is calculated to do the same work in the field which originally could only be done with two horses with the ordinary machine, with four or five rakes.

The principal objection to said machines is the great weight of iron castings attached thereto, and necessitated by the use of so many rakes.

By my plan all this weight is thrown off, and a single trip-rake, sliding in a bar, takes its place. The rake and table are made in such a manner that it is made to trip upward at one end of the table, then rake off the cut grain and throw it clean from the table, and then slide back with the teeth down under the table. When the rake reaches its farthest point the teeth are made to trip up again and rake off, as before, the teeth standing up through the openings or slots in the table when raking off, and returning with the teeth down under the table.

Figure 3:
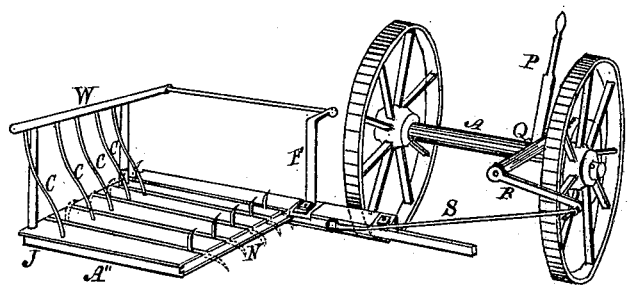
Figure 4:
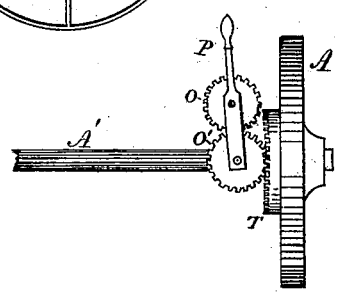

By reference to the accompanying drawings, Figure 1 represents a plan view of a reaper with the floor removed, and with my table and rake attached. Fig. 2 is a perspective view of my sliding rake and frame in which it slides. Fig. 3 is a perspective view of the reaper from the rear end. Fig. 4 is a section of one wheel, cogs, and hand-operating lever.

A A represent two wheels of an ordinary reaper, and A' the axle connecting the same. A'' is a square table, entirely different from those now used. I construct the bottom of the table with a series of broad slats, 2, leaving open spaces B between them, as shown, the purpose of which will be described hereinafter. C C C C C are guards, secured to the table A' and to the rail W, to cause the cut grain to fall clear of the rear end of the table, so as to allow the teeth of the rake to rise behind the cut grain, in position to move forward and rake off the cut grain. A reel is employed with my table and rake, the axle D of which only is necessary to show in the drawing.

Fig. 2 shows a perspective view of the rake and the frame in which it slides. I is a bar, in which is cut a groove, G. The rake is made of metal, and consists of the handle H, made to slide in the said groove G. It is bent at right angles at the point $a$, and also at the point $b$. The said portion $b$ is made to slide in a groove, $c$, of a bar, J, said bar being parallel to the opposite one, I, and connected together by means of the cross-bar X. There is a loose rake-head, U, pivoted to the rake-frame H at the points $d$ $d$, into which are inserted the teeth E, as many as may be desirable. One of the teeth, E', is made longer than the others, and projects down under the rake-head U, the purpose of which will be shown hereafter.

Fig. 2 shows the position of the teeth of the rake standing upward about the middle of the table in the act of raking off the cut grain. The dotted lines in front show the position of the teeth thrown downward horizontally, and ready to be pushed back under the table to rake off another sheaf of cut grain. K K' are front guards, partly surrounding the end and center of the groove-case I, to keep the rake-handle in its groove when at work.

By reference to Fig. 2 it will be seen that I construct a stop, L, bolted to the end portion X of the frame on the under side, for the purpose of throwing up the teeth perpendicularly by the long tooth E' coming in contact with it. The teeth are turned downward at every stroke of the rake by the said long tooth E' coming in contact with the front bar N of the table, as shown in Figs. 1 and 2.

The means I employ for driving and operating the rake is as follows: A cog-wheel, T, is attached to the drive-wheel, either cast to it or bolted in any secure manner. A small cog-wheel is made to mesh into the said wheel T, being secured on the end of a shaft, Q, an upright lever being connected with it to throw the wheels in and out of gear. At the opposite end of said shaft is attached a crank, R, the said crank and handle H of the rake being connected by means of the connecting-rod S. The drive-wheel, by means of the cog-wheel T, imparts motion to the pinion O, shaft Q, and crank R, connecting-rod S, and moves the rake back and forth under the table. The rake-teeth are up when the rake is drawn out, and are down under the table when they are pushed inward, the trip at each end, as above mentioned, throwing the teeth perpendicular and horizontal alternately, making a single self-adjusting rake do the work of four or five ordinary rakes.

The driver's seat (not shown) is placed near the lever P, so that he may conveniently put the rake in and out of gear.

Fig. 4 shows a section with the drive-wheel and cog-wheel attached, and two cog-wheels, O O', with the lever P, attached thereto, for facility in throwing the rake in and out of gear. Either one or two cogs may be used, as desirable.

V is a bearing for the shaft O. W is the guard-rail, into which are secured the guards C and c.

It will be observed that I do away with a great deal of iron and wood, which is necessary to the construction and operation of machines having four or five rakes, which reduces the weight of the machine materially, thus rendering the draft much lighter—so much so that one good horse and one boy can work the reaper. The machine, as I construct it, is also very simple, and not easily liable to get out of order.

The rake is so light that it requires only a very small power to drive it. It will also be observed that as the grain falls on the table it is raked square off to the rear end of the trucks, ready for binding.

Figure 5:
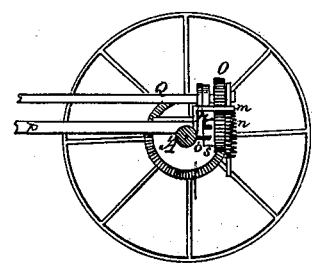
Figure 6:
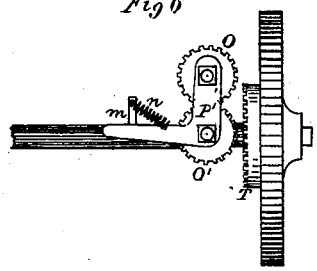

It will be observed that, in addition to the upright hand-lever, as shown in Figs. 3 and 4, I may also employ a bell-crank-shaped foot-lever for throwing the cog-wheels in gear, similar to that shown in Figs. 5 and 6, the former being an inside section of the drive-wheel, and Fig. 6 an end section, back view. P' is the bell-crank lever, secured to the end of the small shaft Q on the outside of the pinion O. Its lower portion is affixed to the lower pinion O'. m is a bracket, fastened to the axle A'. n is a spiral spring connecting the lower portion of the lever P' to said bracket m, for the purpose of holding up the lever and pinion O', so that when the cog-wheels O' and T are away from each other, as shown in Fig. 6, the rake is out of gear.

It will be seen that the back portion of the lower cog-wheel O' projects behind the cogs, and has a smooth surface, as shown in Fig. 5. A notch, r, is cut in it to receive a stationary pin, o, which is firmly inserted in the axle A'. On each revolution of the said cog-wheel O', (which causes one direct stroke of the rake,) the said notch r comes in contact with the pin o, and the said pin is sprung into the notch, and securely locks the rake after a sheaf of grain is raked off.

The operation of the foot-lever is as follows: When the driver wishes to rake off a sheaf of grain he places his foot on the horizontal portion of the foot-lever P', which has the effect of pressing the lower cog-wheel or pinion O' in gear with the cog-wheel T of the drive-wheel.

The rake is thus set in motion, and a sheaf is raked off by the time one revolution of the pinion O' is made, and it stops automatically by means of the said spring n drawing back the lever P', and causing the notch r on the back part of the wheel O to come together, and thus lock the rake and throw the cogs out of gear.

When another sheaf is to be raked off the table the driver repeats the operation of pressing his foot on the said lever P', and the operation of raking is repeated.

The rake is, therefore, not in use except when it is desired by the driver, which saves a great deal of unnecessary friction.

What I claim as my invention, and desire to secure by Letters Patent, is—

1. In a harvester-rake, the combination of the rake-table A', the L-shaped reciprocating rake, consisting of the handle H, bent as shown, and the loose rake-head U, pivoted within the same, substantially as described.

2. In a harvester-rake, the combination of the bar or case I, containing a groove, G, and guards K K', with the bar J, containing groove c, and the handle H, constructed to operate in said groove, substantially as described.

3. In combination with the gearing for transmitting motion to the reciprocating rake, the lever P, for throwing the wheel O in and out of gear, for the purpose of moving or stopping the rake, substantially as described.

4. In combination with the rake-head U, pivoted in the handle H and provided with a lug or tooth, E', the bar N, for tripping said rake-head when at the end of its forward stroke, substantially as described.

5. In combination with the rake-head U, pivoted in handle H and provided with the tooth E', the lug or projection L on the cross-bar X, for tripping the rake at the end of its backward stroke, substantially as described.

Hamilton, Canada, October 12, 1875.

ISAAC MILLS.

Signed in the presence of—
WM. BRUCE,
C. C. HOLMAN.